(12) United States Patent
Allred et al.

(10) Patent No.: US 7,360,100 B2
(45) Date of Patent: Apr. 15, 2008

(54) INTELLIGENT POWER MANAGEMENT CONTROL SYSTEM AND METHOD

(75) Inventors: J. Joseph Allred, Centerville, UT (US); Marc Kevin Uhrey, Layton, UT (US); Steven E. Curtis, Salt Lake City, UT (US); Donley L. Bush, West Valley City, UT (US)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 346 days.

(21) Appl. No.: 10/633,063

(22) Filed: Aug. 1, 2003

(65) Prior Publication Data

US 2005/0028014 A1 Feb. 3, 2005

(51) Int. Cl.
*G06F 1/00* (2006.01)
*G06F 1/26* (2006.01)
*G06F 1/32* (2006.01)

(52) U.S. Cl. .................. 713/300; 713/320; 713/324; 713/330

(58) Field of Classification Search ............ 713/300, 713/320, 324, 330
See application file for complete search history.

(56) References Cited

U.S. PATENT DOCUMENTS

| | | | | |
|---|---|---|---|---|
| 4,349,879 | A * | 9/1982 | Peddie et al. ............ | 700/295 |
| 5,808,376 | A * | 9/1998 | Gordon et al. ............ | 307/66 |
| 6,229,286 | B1 * | 5/2001 | Tokuyama ............... | 320/132 |
| 6,393,233 | B1 * | 5/2002 | Soulier ................... | 399/88 |
| 6,612,496 | B1 * | 9/2003 | Barkan et al. ............ | 235/462.22 |
| 6,792,338 | B2 * | 9/2004 | Johnson .................. | 700/297 |
| 6,918,645 | B2 * | 7/2005 | Takahashi ................ | 347/16 |
| 7,171,176 | B1 * | 1/2007 | Birleson .................. | 455/173.1 |
| 2003/0048007 | A1 | 3/2003 | Cordner et al. | |
| 2003/0144043 | A1 * | 7/2003 | Seo ........................ | 455/574 |

FOREIGN PATENT DOCUMENTS

WO   WO 0118932 A   3/2001

* cited by examiner

*Primary Examiner*—A. Elamin
*Assistant Examiner*—Michael J Brown
(74) *Attorney, Agent, or Firm*—McAndrews, Held & Malloy, Ltd.; Peter J. Vogel; Michael A. Dellapenna

(57) ABSTRACT

Certain embodiments of the present invention relate to a dynamic power management system. The system includes a power input providing power to an imaging system, measurement unit(s) for measuring current and/or voltage in the imaging system, and a power management controller allocating available power among components in the imaging system. The power management controller may allow a battery to charge at a maximum rate based on current used by the imaging system components. The measurement unit(s) may measure a voltage and a current for the power provided to the imaging system. The power management controller may control current drawn by the imaging system components. The system may also include a limit sensor for detecting when current consumption exceeds a certain limit. Additionally, the system may include at least one switching unit controlled by the power management controller. The switching unit(s) control an amount of power routed to imaging system components.

21 Claims, 2 Drawing Sheets

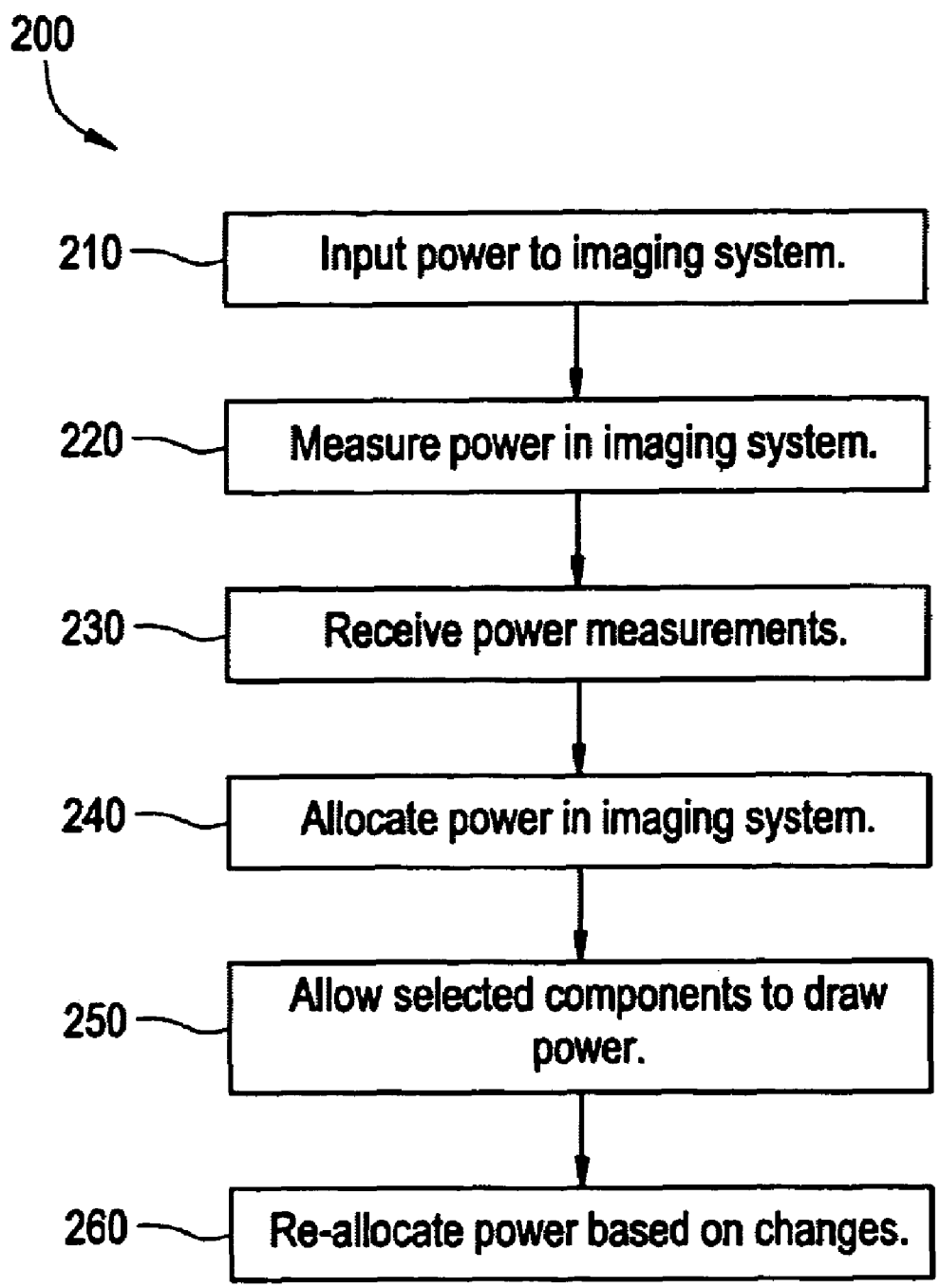

INTELLIGENT POWER MANAGEMENT CONTROL SYSTEM AND METHOD

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present invention generally relates to power management. In particular, the present invention relates to intelligent power management and control in an imaging system.

Imaging systems, such as x-ray imaging systems, produce images through emission of rays, waves, particles, and radiation, for example. In many imaging systems, emissions may be facilitated by a power source, such as a battery. In an x-ray system, for example, x-rays are generated using a battery power source. As x-rays are generated, the battery is depleted. Therefore, the battery is recharged by the imaging system to allow for continued imaging.

Present imaging systems budget power to a battery charger based on a worst-case current and/or power consumption. That is, power is routed to the battery charger assuming that maximum current is allocated to main system power and all other system components. Current and/or power allocation in present imaging systems is a static allocation. Limits on battery current and battery recharge rate limit the number of images that may be generated.

However, current and/or power consumption varies by use and duration. For example, printers draw more power when printing than when idle. Current drawn by motors varies by use and direction of the motor. Therefore, a system that adapts to changing power consumption would be highly desirable.

A power cord may be rated at a capacity of 15 or 20 amps, for example, at a rated voltage, such as 110 V or 120 V. A standard wall plug, for example, is rated at 15 amps and 120 volts. It is desirable to keep power consumption within the rated capacity. However, some systems need more power to operate than is available for 15 or 20 amp service at 120 volts, based on a static power allocation. Therefore, a system which manages power consumption within a rated cord capacity would be highly desirable.

Therefore, a need exists for improved power management in an imaging system. A system and method that dynamically allocates power in a system based on usage and availability would be highly desirable.

BRIEF SUMMARY OF THE INVENTION

Certain embodiments of the present invention provide a method and system for dynamic current and power management in an imaging system. Certain embodiments may be used with a plurality of imaging systems and imaging modalities. In a certain embodiment, the adaptable power system includes a measurement unit for measuring current and/or voltage in an imaging system, a main system power for providing power to the imaging system for core system functions, a battery charger for recharging a battery used for imaging, and a power controller for allocating power among the main system power and the battery charger based on a power measurement from the measurement unit.

In an embodiment, the measurement unit measures current and/or voltage at a plurality of points in the imaging system. The power controller may allocate remaining power to the battery charger after main system power has been allocated. The system may also include at least one component providing additional function in the imaging system. The power controller may allocate power among the component(s). The power controller may dynamically allocate power within a current, voltage, and/or power limit.

In a certain embodiment, the method includes measuring current and/or voltage input in an imaging system and allocating power in the imaging system based on a system configuration and the current input in the imaging system. The method may also include measuring current and/or voltage at a plurality of locations in the imaging system. The method may also include dynamically allocating power based on immediate system usage. Power may be re-allocated based on a change in configuration and/or a current consumption exceeding a predefined limit. Remaining current may be allocated to a battery charger. In an embodiment, the method includes maintaining at least a minimum level of power for basic imaging system functions. The method may also include controlling an amount of current drawn by components in the imaging system.

In a certain embodiment, a power management system for an imaging system includes a power input providing power to an imaging system, at least one measurement unit for measuring current and/or voltage in the imaging system, and a power management controller allocating available power among components in the imaging system. The power management controller may allow a battery for the imaging system to charge at a maximum rate based on current usage by the components in the imaging system. The measurement unit(s) may measure a voltage and a current for the power provided to the imaging system. The power management controller may control current drawn by the components in the imaging system. The system may also include a limit sensor for detecting when current and/or voltage usage exceeds a certain power limit. Additionally, the system may include at least one switching unit controlled by the power management controller. The switching unit(s) control an amount of power routed to components in the imaging system.

BRIEF DESCRIPTION OF SEVERAL VIEWS OF THE DRAWINGS

FIG. 2 illustrates a flow diagram for a method for dynamic power management used in accordance with an embodiment of the present invention.

Figure 1:
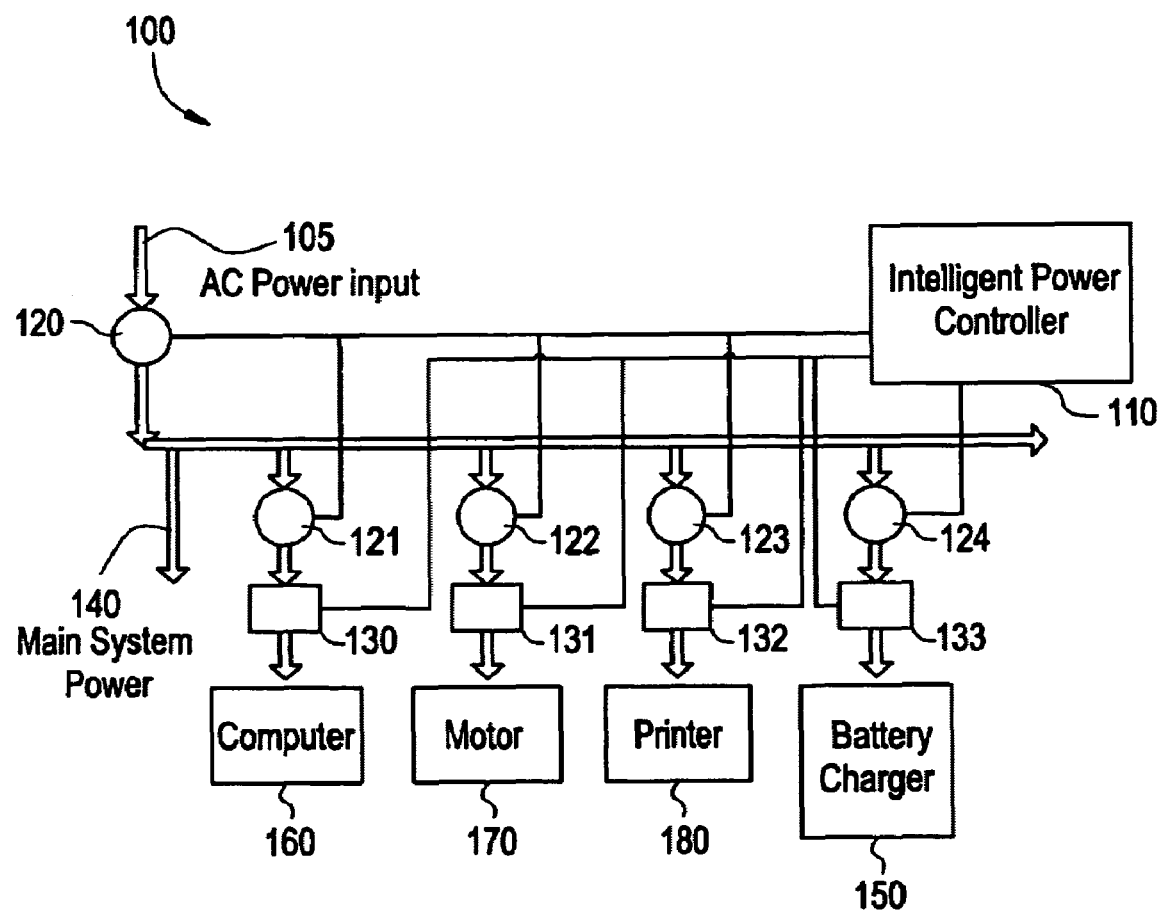
FIG. 1 illustrates a mobile x-ray system with adaptive power management used in accordance with an embodiment of the present invention.

The foregoing summary, as well as the following detailed description of certain embodiments of the present invention, will be better understood when read in conjunction with the appended drawings. For the purpose of illustrating the invention, there is shown in the drawings, certain embodiments. It should be understood, however, that the present invention is not limited to the arrangements and instrumentality shown in the attached drawings.

DETAILED DESCRIPTION OF THE INVENTION

Certain embodiments of the present invention may be used with a variety of imaging systems, such as x-ray, ultrasound, computed tomography (CT), magnetic resonance (MR), electron beam tomography (EBT), positron emission tomography (PET), and single photon emission computed tomography (SPECT) imaging systems. Certain embodiments may be used with mobile and/or stationary imaging systems. Certain embodiments have application in medical fields as well as industrial and security fields, for example. For purposes of illustration only, certain embodiments are described in the context of a mobile x-ray imaging system.

FIG. 1 illustrates a mobile x-ray system with adaptive power management 100 used in accordance with an embodiment of the present invention. The system 100 includes a power input 105, an intelligent power controller 110, measurement units 120-124, switching units 130-133, main system power 140, a battery charger 150, and other components such as a computer 160, a motor 170, and a printer 180. The measurement units 120-124 transmit data to the intelligent power controller 110. The power controller 110 controls the switching units 130-133, which route current to components such as the battery charger 150, the computer 160, the motor 170, and the printer 180.

The power controller 110 may be implemented in general purpose (such as a general purpose computer) or dedicated hardware or may be implemented in software, for example. The power controller 110 allocates current from the power input 105 to the components of the system 100 based on current and/or voltage measurements. The power controller 110 receives voltage and/or current information from the measurement units 120-124 associated with the components of the system 100. The power controller 110 determines current allocation based on the measurement information. Based on the measurement information, the power controller 110 controls the switching units 130-133 to provide current.

The measurement units 120-124 measure current and/or voltage at various points in the system 100 to determine current consumption. In an embodiment, the measurement units 120-124 are located at each component of the system 100. In an alternative embodiment, current and voltage may be measured at the power input 105.

In an embodiment, the measurement units 120-124 include root-mean-squared (RMS) measurement devices. The RMS measurement devices measure current and/or voltage. In an embodiment, the RMS measurement device measures current and/or voltage because current and voltage may not necessarily be in phase with each other. Additionally, the RMS measurement device may measure current and/or voltage because current consumption increases if 120 V AC inlet voltage decreases. In an embodiment, voltage is constant and current is "on" or "off" depending upon component use. A real power load may be calculated from the power input 105, such as the wall outlet AC power input. For more accurate measurement and power management, RMS measurement devices may measure current and voltage at individual components of the system 100.

Alternatively, one or more of the measurement units 120-124 may include a current transformer (a few turns of wire in a coil, for example), driving a load to measure voltage, an inline resistor, an/or other current or voltage measuring devices. The measurement units 120-124 may obtain isolated current/voltage measurements in the system 100.

In an embodiment, a power cord is rated at a capacity of 15 or 20 amps at a rated voltage of 120 V at a frequency of 60 Hertz. European systems may be rated at 220 or 110 volts at 50 Hertz. In an embodiment, the measurement units 120-124 transmit inlet 105 voltage and current measurements, main system power 140, motor 170 power, computer 160 power, printer 180 power, and/or other accessory power, for example, to the power controller 110. The power controller 110 controls the battery charger 150 rate and power/current to components such as the motor 170, the computer 160, the printer 180, and other options or accessories so that the system 100 operates with desired functions without exceeding power cord limits.

The power controller 110 may also control power to an uninterruptible power supply (UPS) or a UPS battery charger for the system 100 as well. The measurement units 120-124 may collect data for the UPS and/or UPS charger. The UPS may help ensure that main system power 140 is stable.

The power controller 110 activates the switching units 130-133 or transmits commands to the switching units according to current demand and/or power availability in the system 100. In an embodiment, a current limit for a component in the system 100 is programmable. The power controller 110 may determine component current limits based on input power 105 and other constraints, for example, or the current limits may be programmed or preset, for example. The power controller 110 may program the switching units 130-133 to pull a certain amount of current based on the current limits and current/voltage measurements. The power controller 100 may also turn the switching units 130-133 on or off. For example, the printer 180 and/or the computer 160 may be turned off when not in use to provide more current for imaging and battery charging. Turning the switching units 130-133 on or off may turn the component connected to the switching unit on or off. The power controller 110 controls the power/current pulled by the switching units 130-133 to supply components, such as the battery charger 150, computer 160, motor 170, and printer 180, for example. In an embodiment, main system power 140 may not be turned off or shut down by the power controller 110 so that a basic amount of power is provided to maintain basic system functions.

The power controller 110 may allow a higher power system 100 to operate within a 15 or 20 amp power cord rating at a rated voltage (120 volts, for example). The measurement units 120-124 monitor actual current consumption in the system 100. The power controller 110 may remove or reduce available current to components not in use at the moment and re-allocate the power to components in use at the moment and/or increase the battery charger 150 current. The power controller 110 allows the current demands of the system 100 to be dynamically met based on present circumstances and operations. In an embodiment, a user of the system 100 configures the system 100 or selects a configuration, and the power controller 110 determines whether the configuration is possible given constraints on maximum current draw. The power controller 110 may configure the system 100 accordingly.

The system 100 may also include a limit sensor. The limit sensor may be incorporated in the power controller 110 or located elsewhere in the system 100. If current consumption exceeds the cap limit, then the limit sensor helps ensure that the limit is not exceeded for more than a certain amount of time (a surge period, for example). The limit sensor may be triggered by the power controller 110 or another external source or triggered autonomously based on current/voltage measurements. The limit sensor detects excess current over a defined period of time. If current drawn by the system 100 exceeds the power cord limit for more than the defined period of time, then the limit sensor may trigger a system 100 or component shutdown. The limit sensor may be implemented as part of the power controller 10 or may be a separate controller or a state machine on a field programmable gate array (FPGA) for example. The limit sensor may add a safety shutoff to the system 100. The power controller 110 may also have hardware and/or software checks to ensure safety and proper current consumption.

In operation, for example, a user connects the system 100, such as a mobile x-ray system, to a power source, such as a wall AC power outlet. The power controller 110 determines the cord current capacity limits for the input power 105 and the system 100. The measurement units 120-124 measure current and voltage at the input power 105, main system power 140, battery charger 150, computer 160, motor 170, printer 180. A user selects a configuration for the system 100, such as fluoroscopic imaging. The power controller 110 allocates power to components in the system 100 based on available current and the user configuration. If the user attempts to turn on the computer 160 during imaging, the power controller 110 manages power to the system 100 and controls the switching units 130-133 accordingly. If insufficient current is available to provide main system power 140 for fluoroscopic x-ray imaging, then the power controller 110 may reduce current to or deactivate the computer 160. Similarly, if a user attempts to print using the printer 180 during imaging and insufficient current is available or usage would exceed current limits, then the power controller 110 temporarily disables the printer 180. Preferably, the power controller 110 maintains main system power 140 and at least a minimal level of current to the battery charger 150 to continue recharging the battery for imaging.

Alternatively, the computer 160 may remain on to run software used for intelligent power control and other imaging system functions. If additional power is routed to provide main system power 140, the battery charging rate is reduced rather than deactivating the computer 160.

Thus certain embodiments of the present invention monitor actual current consumption and control power that is not used by a component at a certain time. Certain embodiments represent a dynamic, adaptable power allocation and management system 100. Certain embodiments dynamically allocate available current to the battery charger up to the allowed limits 150.

FIG. 2 illustrates a flow diagram for a method 200 for dynamic power management used in accordance with an embodiment of the present invention. First, at step 210, power is input to an imaging system. The power may be AC or DC power from a power source, such as a wall outlet or other power source. Then, at step 220, current and/or voltage is measured at various points in the imaging system and attached accessories. Current may be measured at the power input and/or at a plurality of points within the system, such as at power connections (e.g., a switch) to components and options in the system. Components and options may include a computer, a printer, a motor, and a battery charger, for example.

At step 230, an adaptable power controller, such as the power controller 110, receives imaging system current measurements. Then, at step 240, the power controller 110 allocates power to the imaging system and components based on the current measurements, configuration information, and other system factors, for example. For example, the power controller 110 allocates power to system components based on a selected imaging mode of operation, a number of components in use, component current consumption, available input current, and cord current capacity limits, for example.

Next, at step 250, switches or other current routing units allow selected components in the system to draw current, as determined by the adaptable power controller. At step 260, if a configuration of the imaging system changes or different components are activated and/or deactivated, the adaptable power controller re-allocates power in the imaging system. Additionally, if a current limit is reached, then the power controller re-allocates power in the imaging system.

Thus, certain embodiments of the present invention provide a method and system for dynamic power management in an imaging system. The system and method may be used with a plurality of imaging system modalities and platforms. Certain embodiments provide maximum power to battery recharging in view of actual system power requirements and consumption. Certain embodiments allow power allocation to be adjusted dynamically based on current usage and configuration of an imaging system. Certain embodiments measure current, voltage, and/or power to allocate input current. Certain embodiments allow power to be allocated and managed within safety limits for input current and/or voltage and cords in the system. Certain embodiments allow intelligent power management of an imaging system not limited by a worst case current scenario.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. An adaptable power management system for dynamic current and power management in an imaging system, said power management system comprising:
    a plurality of measurement units for measuring current in the imaging system, each of the plurality of measurement units associated with one of a plurality of components of the imaging system to measure current in the component;
    a main system power for providing power to the imaging system for core imaging system functions;
    a battery charger for recharging a battery used for imaging; and
    a power controller for dynamically allocating power among the main imaging system power and the battery charger based on current measurements from the plurality of measurement units and imaging system configuration information, wherein dynamic allocation and re-allocation occurs automatically based on the current measurements from the plurality of measurement units and imaging system configuration information, and wherein the imaging system configuration information includes a selected imaging mode of operation, a number of imaging system components in use, imaging system component current consumption, and an available input current.

2. The power management system of claim 1, wherein the measurement unit measures at least one of current and voltage at a plurality of points in the imaging system.

3. The power management system of claim 1, wherein the power controller controls battery charging current after main system power has been allocated.

4. The power management system of claim 1, further comprising at least one component providing additional function in the imaging system.

5. The power management system of claim 4, wherein the power controller allocates power among the at least one component.

6. The power management system of claim 1, wherein the power controller dynamically allocates power within a power limit.

7. The power management system of claim 1, wherein the imaging system configuration information includes at least one of a selected imaging mode of operation, a number of components in use, component current consumption, available input current and a cord current capacity limit.

8. A method for dynamic power management in an imaging system, said method comprising:
    measuring current input in an imaging system;
    measuring current usage at a plurality of components in the imaging system; and
    dynamically allocating power in the imaging system based on an imaging system configuration, the current usage and the current input in the imaging system, wherein dynamic allocation occurs automatically based on the system configuration, the current usage and the current input in the imaging system, and wherein the imaging system configuration information includes a selected imaging mode of operation, a number of imaging system components in use, the imaging system component current consumption, and the available input current.

9. The method of claim 8, wherein the measuring step further comprises measuring at least one of voltage and current at a plurality of locations in the imaging system.

10. The method of claim 8, wherein the allocating step further comprises dynamically allocating power based on system usage.

11. The method of claim 8, further comprising re-allocating power in the imaging system based on a change in configuration.

12. The method of claim 8, further comprising re-allocating power in the imaging system based on current consumption exceeding a predefined limit.

13. The method of claim 8, further comprising allocating available current to a battery charger.

14. The method of claim 8, further comprising maintaining at least a minimum level of power for basic imaging system functions.

15. The method of claim 8, further comprising controlling an amount of current drawn by components in the imaging system.

16. A power management system for dynamic current and power management in an imaging system, said system comprising:
    a power input providing power to an imaging system;
    at least one measurement unit for measuring current in the imaging system; and
    a power management controller dynamically allocating available power among components in the imaging system based on a system configuration, wherein the system configuration includes a selected imaging mode of operation, a number of imaging system components in use, imaging system component current consumption, available input current and a cord current capacity limit, wherein the dynamic allocation and re-allocation occurs automatically based on the current measurements from the at least one measurement unit and the imaging system configuration information.

17. The power management system of claim 16, wherein the power management controller allows a battery for the imaging system to charge at a maximum rate based on current consumption by the components in the imaging system.

18. The power management system of claim 16, wherein the at least one measurement unit measures a voltage and a current for the power provided to the imaging system.

19. The power management system of claim 16, wherein the power management controller controls current drawn by the components in the imaging system.

20. The power management system of claim 16, further comprising a limit sensor for detecting when current consumption exceeds a certain limit.

21. The power management system of claim 16, further comprising at least one switching unit controlled by the power management controller, wherein the at least one switching unit controls an amount of power routed to at least one component in the imaging system.

* * * * *